(12) United States Patent
Li et al.

(10) Patent No.: US 10,666,399 B2
(45) Date of Patent: May 26, 2020

(54) ALLOCATION METHOD AND APPARATUS FOR CODE BLOCK GROUPS IN A TRANSPORT BLOCK

(71) Applicant: YULONG COMPUTER TELECOMMUNICATION SCIENTIFIC (SHENZHEN) CO., LTD. (CN), Guangdong (CN)

(72) Inventors: Mingju Li, Guangdong (CN); Yunfei Zhang, Guangdong (CN)

(73) Assignee: YULONG COMPUTER TELECOMMUNICATION SCIENTIFIC (SHENZHEN) CO., LTD. (CN), Shenzhen (CN)

( * ) Notice: Subject to any disclaimer, the term of this patent is extended or adjusted under 35 U.S.C. 154(b) by 82 days.

(21) Appl. No.: 15/934,958

(22) Filed: Mar. 24, 2018

(65) Prior Publication Data

US 2018/0278375 A1 Sep. 27, 2018

(30) Foreign Application Priority Data

Mar. 24, 2017 (CN) .......................... 2017 1 0184391

(51) Int. Cl.
*H04W 4/00* (2018.01)
*H04L 1/18* (2006.01)
*H04L 1/00* (2006.01)
*H04L 5/00* (2006.01)

(52) U.S. Cl.
CPC .......... *H04L 1/1812* (2013.01); *H04L 1/0083* (2013.01); *H04L 1/1893* (2013.01); *H04L 1/1896* (2013.01); *H04L 5/0055* (2013.01)

(58) Field of Classification Search
CPC ... H04L 1/1812; H04L 1/0083; H04L 1/1893; H04L 1/1896; H04L 5/0055
See application file for complete search history.

(56) References Cited

U.S. PATENT DOCUMENTS

| 10,033,505 B2 * | 7/2018 | Malladi ................. H04L 5/0057 |
| 2001/0036185 A1 * | 11/2001 | Dempo ................... H04L 29/06 370/392 |

(Continued)

FOREIGN PATENT DOCUMENTS

CN 101615986 A 12/2009

OTHER PUBLICATIONS

Extended European Report issued in parallel European Application No. 18163569.9-1219, dated Aug. 17, 2018, 7 pages.

(Continued)

*Primary Examiner* — Stephen M D Agosta
(74) *Attorney, Agent, or Firm* — Bayes PLLC

(57) ABSTRACT

The present disclosure provides an allocation method and apparatus for Code Block Groups in a Transport Block. The Method comprises the following steps: sending a Transport Block through a first device to a second device, wherein, the Transport Block comprises at least one Code Block Group which is obtained by the first device allocating the Code Blocks in the Transport Block according to a preset allocation strategy; and sending the preset allocation strategy through the first device to the second device. The technical scheme provided by the present disclosure has an advantage of high efficiency.

4 Claims, 5 Drawing Sheets sending a TB through a first device to a second device, wherein, the TB comprises 5 CB Groups, and each of the CB Groups has 10 CBs — S301 sending candidate values (4, 5, 6, 7) of X through the first device to the second device via a Radio Resource Control (RRC) signal, and sending a selected value 5 of the X through the first device to the second device via a Downlink Control Information (DCI) signal — S302

(56) References Cited

U.S. PATENT DOCUMENTS

| | | | | |
|---|---|---|---|---|
| 2003/0123409 | A1* | 7/2003 | Kwak | H04L 1/0061 |
| | | | | 370/335 |
| 2011/0080975 | A1* | 4/2011 | Toda | H04B 7/0413 |
| | | | | 375/295 |
| 2011/0119549 | A1 | 5/2011 | Lee et al. | |
| 2015/0281089 | A1* | 10/2015 | Marchetti | H04L 47/125 |
| | | | | 370/235 |
| 2016/0226643 | A1* | 8/2016 | Mallik | H04L 5/0055 |
| 2018/0054800 | A1* | 2/2018 | Yeo | H04W 68/02 |
| 2018/0167171 | A1* | 6/2018 | Wu | H04L 1/18 |
| 2018/0287752 | A1* | 10/2018 | Park | H04L 5/0044 |
| 2018/0323920 | A1* | 11/2018 | Zhu | H04L 5/0016 |

OTHER PUBLICATIONS

Lenovo et al., "Enhanced HARQ feedback for downlink transmission", Agenda Item: 8.1.3.3.1; 3GPP TSG RAN WG1 Meeting #88, R1-1702665; Athens, Greece, Feb. 13-17, 2017, 3 page.

Media Tek Inc., "On multiple HARQ bits per TB and feedback mechanism", Agenda Item 8.1.3.3.1; 3GPP TSG RAN WG1 Meeting #88, R1-1702738; Athens, Greece, Feb. 13-17, 2017, 4 pages.

First Office action issued in corresponding Chinese Patent Application No. 201710184391.0, dated Aug. 27, 2019, with English Translation 12 pages.

"Enhanced HARQ feedback for downlink transmission," R1-1702665, 3GPP TSG RAN WG1 Meeting #88, Athens, Greece, Feb. 13-17, 2017, Agenda Item 8.1.3.3.1, Source: Lenovo, Motorola Mobility, 4 pages.

\* cited by examiner

ALLOCATION METHOD AND APPARATUS FOR CODE BLOCK GROUPS IN A TRANSPORT BLOCK

CROSS REFERENCE

This application claims priority of Chinese Patent Application No. 201710184391.0 filed on Mar. 24, 2017, entitled "An allocation method and apparatus for Code Block Groups in a Transport Block", which is incorporated herein by reference in its entirety.

TECHNICAL FIELD

The present invention relates to the field of electronics and communication, and in particular relates to an allocation method and apparatus for Code Block Groups in a Transport Block.

BACKGROUND

Under the circumstances of Long Time Evolution (LTE) in prior art, data is transmitted in basic units of Transport Blocks (TBs), and one TB only can have one Hybrid Automatic Repeat request (HARQ), for example, one Bit of feedback which is ACK or NACK. Even if one TB is divided into multiple Code Blocks (CBs) to be sent, the HARQ feedback is still one Bit, and as a result, when a TB is divided into multiple CBs to be sent, even if only one CB is falsely transmitted, the HARQ feedback would be NACK, and the entire TB would need to be retransmitted, which has low efficiency.

SUMMARY

The present invention provides an allocation method of Code Block Groups in a Transport Block, and the allocation method of Code Block Groups in a Transport Block, provided by the present application has an advantage of high efficiency.

In a first aspect, an allocation method of Code Block Groups in a Transport Block is provided, wherein, the method comprises the following steps: sending a Transport Block through a first device to a second device, wherein, the Transport Block comprises at least one Code Block Group which is obtained by the first device allocating the Code Blocks in the Transport Block according to a preset allocation strategy; and sending the preset allocation strategy through the first device to the second device.

Optionally, the preset allocation strategy is that the first device divides all the Code Blocks of a Transport Block into X Code Block Groups, wherein, if the sum M of all the Code Blocks is exactly divisible by X, the X Code Block Groups are allocated the same number of Code Blocks; and if the sum M of all the Code Blocks is not exactly divisible by X, L Code Blocks are allocated to the first or last Code Block Group among the X Code Block Groups, and (M−L)/(X−1) Code Blocks are allocated to the remaining Code Block Groups among the X Code Block Groups, where L is the remainder of M divided by X−1, and X is a positive integer.

Optionally, the preset allocation strategy is that the first device divides all the Bits of a Transport Block into one or more Code Block Groups, wherein, each of the Code Block Groups contains an integer number of Code Blocks, and the sum of Bits of each of the Code Block Groups is less than or equal to Z, where Z is a positive integer.

Optionally, the preset allocation strategy is that, if the sum M of all the Code Blocks of a Transport Block is exactly divisible by Y, the first device allocates Y Code Blocks to each Code Block Group in the Transport Block; if the sum M of all the Code Blocks of a Transport Block is not exactly divisible by Y, the first device allocates P Code Blocks to the first or last Code Block Group in the Transport Block, and allocates Y Code Blocks to the remaining Code Block Groups in the Transport Block, where P is the remainder of M divided by Y, and Y is an positive integer.

Optionally, the step of sending the preset allocation strategy through the first device to the second device comprises: sending multiple candidate values of the X through the first device to the second device via a first signal, and sending the selected value of the X through the first device to the second device via a second signal; or sending the selected value of the X through the first device to the second device via a first signal.

Optionally, the step of sending the preset allocation strategy through the first device to the second device comprises: sends multiple candidate values of the Z through the first device to the second device via a first signal, and sending the selected value of the Z through the first device to the second device via a second signal; or sending the selected value of the Z through the first device to the second device via a first signal.

Optionally, the step of sending the preset allocation strategy through the first device to the second device comprises: sending multiple candidate values of the Y through the first device to the second device via a first signal, and sending the selected value of the Y through the first device to the second device via a second signal; or sending the selected value of the Y through the first device to the second device via a first signal.

Optionally, the value of X, Y, or Z is a preset value stored in the second device.

Optionally, the method is used for allocation of CB Groups in an initially transmitted TB.

Optionally, the total number of CB Groups in a retransmitted TB equals the total number of unsuccessfully-received CB Groups in the initially transmitted TB.

Optionally, if the retransmitted TB has multiple CB Groups, the number of CBs or Bits contained in the multiple CB Groups has the same allocation manner as the number of CBs or Bits contained in the corresponding unsuccessfully-received CB Groups in the initially transmitted TB.

In a second aspect, an allocation apparatus for Code Block Groups in a Transport Block is provided, the apparatus comprises a transceiver unit and a processing unit, the transceiver unit is for sending a Transport Block to a second device, wherein, the Transport Block comprises at least one Code Block Group which is obtained by the processing unit allocating the Code Blocks in the Transport Block according to a preset allocation strategy; and the transceiver unit is also for sending the preset allocation strategy to the second device.

Optionally, the preset allocation strategy is that a first device divides all the Code Blocks of a Transport Block into X Code Block Groups, wherein, if the sum M of all the Code Blocks is exactly divisible by X, the X Code Block Groups are allocated the same number of Code Blocks; and if the sum M of all the Code Blocks is not exactly divisible by X, L Code Blocks are allocated to the first or last Code Block Group among the X Code Block Groups, and (M−L)/(X−1) Code Blocks are allocated to the remaining Code Block Groups among the X Code Block Groups, where L is the remainder of M divided by X−1.

Optionally, the preset allocation strategy is that a first device divides all the Bits of a Transport Block into one or more Code Block Groups, wherein, each of the Code Block Groups contains an integer number of Code Blocks, and the sum of Bits of each of the Code Block Groups is less than or equal to Z.

Optionally, the preset allocation strategy is that, if the sum M of all the Code Blocks of a Transport Block is exactly divisible by Y, the first device allocates Y Code Blocks to each Code Block Group in the Transport Block; if the sum M of all the Code Blocks of a Transport Block is not exactly divisible by Y, the first device allocates P Code Blocks to the first or last Code Block Group in the Transport Block, and allocates Y Code Blocks to the remaining Code Block Groups in the Transport Block, where P is the remainder of M divided by Y.

Optionally, the transceiver unit is particularly for sending multiple candidate values of the X to a second device via a first signal, and sending the selected value of the X to the second device via a second signal; or sending the selected value of the X to a second device via a first signal.

Optionally, the transceiver unit is particularly for sending multiple candidate values of the Z to a second device via a first signal, and sending the selected value of the Z to the second device via a second signal; or sending the selected value of the Z to a second device via a first signal.

Optionally, the transceiver unit is particularly for sending multiple candidate values of the Y to a second device via a first signal, and sending the selected value of the Y to the second device via a second signal; or sending the selected value of the Y to a second device via a first signal.

Optionally, the value of X, Y, or Z is a preset value stored in the second device.

Optionally, the apparatus is configured for allocation of CB Groups in an initially transmitted TB.

Optionally, the total number of CB Groups in a retransmitted TB equals the total number of unsuccessfully-received CB Groups in the initially transmitted TB.

Optionally, if the retransmitted TB has multiple CB Groups, the processing unit allocates the number of CBs or Bits contained in the multiple CB Groups in the same allocation manner as the number of CBs or Bits contained in the corresponding unsuccessfully-received CB Groups in the initially transmitted TB.

In a third aspect, an electronic device for allocating Code Block Groups in a Transport Block comprises a processor, a memory and a transceiver interconnected by a bus line, the transceiver is for sending and receiving data, the memory is for storing program codes, the processor is for calling the program codes stored in the memory to execute the following steps:

sending a Transport Block to a second device, wherein, the Transport Block comprises at least one Code Block Group which is obtained by the processing unit allocating the Code Blocks in the Transport Block according to a preset allocation strategy; and sending the preset allocation strategy to the second device.

In a fourth aspect, a first device is provided, wherein, the first device comprises the electronic device for allocating Code Block Groups in a Transport Block provided in the third aspect.

In the technical solution provided by the present disclosure, the CBs in a TB are allocated to obtain at least one CB Group, so that HARQ feedback based on CB Groups can be made, and retransmission based on basic units of CB Groups can also be performed, with an advantage of high efficiency.

BRIEF DESCRIPTION OF THE DRAWINGS

In order to more clearly describe the technical solutions in the embodiments of the present disclosure or in the prior art, hereinafter, the accompanying drawings used for describing the embodiments or the prior art will be briefly introduced. Apparently, the accompanying drawings described below are only directed to some embodiments of the present disclosure, and for a person skilled in the art, without expenditure of creative labor, other drawings can be derived on the basis of these accompanying drawings.

DETAILED DESCRIPTION OF EMBODIMENTS

A clear and complete description of the technical solutions of the embodiments of the present disclosure is given below, in conjunction with the accompanying drawings. Apparently, the embodiments described below are part of, but not all of, the embodiments of the present disclosure. All the other embodiments, obtained by a person skilled in the art on the basis of the embodiments described in the present disclosure without expenditure of creative labor, belong to the protection scope of the present disclosure.

In the present disclosure, the first device may in particular be a base station, although it may also be other types of devices, such as a smart terminal, in a practical application; the second device may in particular be a smart terminal, although it may also be a base station when the first device is a smart terminal. The embodiments of the present disclosure are not limited to the above-mentioned implementing forms of the first and second devices.

Figure 1:
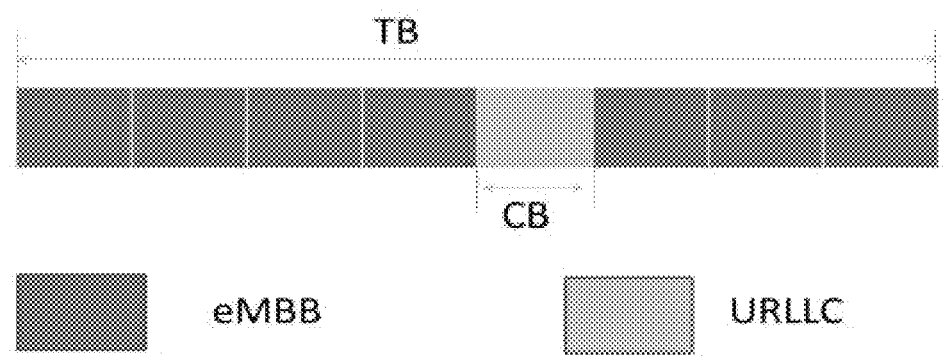
FIG. 1 is a structural schematic diagram of a Transport Block.

In New Radio (NR) technology, because multiple types of services such as enhanced Mobile BroadBand (eMBB) and Ultra-Reliable and Low Latency Communications (URLLC) need to be supported simultaneously, diversity multiplexing of the multiple types of services may be used. A phenomenon possibly caused by such diversity multiplexing is that, a first device allocates N Resource Blocks (RBs) of one Slot to eMBB UE #1, and the data and control signal corresponding to UE #1 are configured to be sent in Slot1 by the first device, however, in the middle of Slot1, a service of URLLC UE #2 suddenly arrived, and in order to meet the time-delay requirement for URLLC service, resource may be immediately allocated to URLLC UE #2, thus it is possible that part of symbols in the middle of Slot1 is then allocated to URLLC UE #2, that is to say, part of or all of the N Resource Blocks do not transmit the data and control signal of eMBB UE #1 in the duration of this part of symbols (as shown in FIG. 1, one CB in the middle is allocated to URLLC UE #2), but instead transmit the data and control signal of URLLC UE #2. In such situation, one TB of eMBB UE #1 would be divided into multiple CBs to be transmitted, but even if only one CB is falsely transmitted, one Bit of HARQ feedback which is NACK is still returned, and as a result, the entire TB would need to be retransmitted. This causes very low efficiency, because the TB of eMBB UE #1 is relatively large.

In order to increase efficiency, it is proposed to send HARQ feedback in a form of CB Groups, wherein the size of a CB Group is smaller than or equal to the size of a TB. In this way, when a TB is very large, it can be divided into a plurality of CB Groups for feedback, i.e., one Bit of HARQ feedback is configured for each CB Group, so that only those falsely transmitted CB Groups, with a feedback of NACK, need to be retransmitted, and it is not required to retransmit the entire TB. The NACK configuration of the above-mentioned one Bit of feedback may be that the value of 0 for the one Bit corresponds to NACK, and the value of 1 corresponds to ACK; or vice versa. The present disclosure is not limited to the above-mentioned specific values for ACK or NACK. In such situation, how to allocate the CB Groups and how to notify a user of the allocation manner of CB Groups remains a problem to be solved. Thus, the present disclosure provides an allocation method of Code Block Groups in a Transport Block to solve the problem about the allocation manner of CB Groups, so as to improve efficiency.

Figure 2:
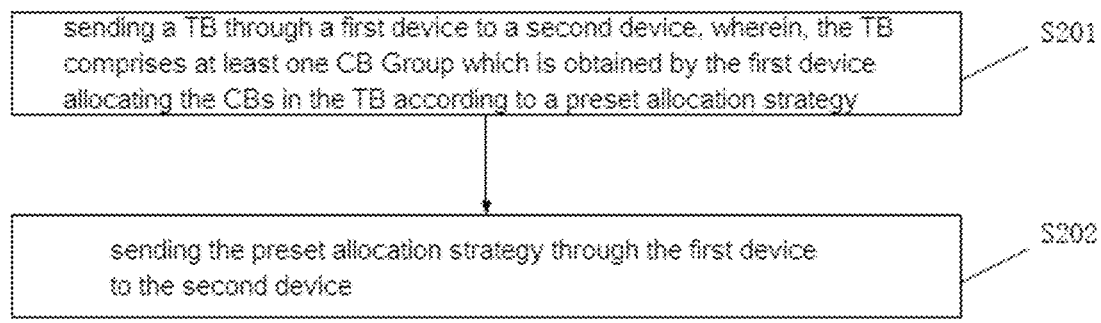
FIG. 2 is a flow chart of an allocation method of Code Block Groups in a Transport Block according to some embodiments of the present disclosure.

Referring to FIG. 2, FIG. 2 shows an allocation method of Code Block Groups in a Transport Block provided by the present application, which is implemented by a first device, the method as shown in FIG. 2 comprises the following steps:

Step S201, sending a TB through a first device to a second device, wherein the TB comprises at least one CB Group which is obtained by the first device allocating the CBs in the TB according to a preset allocation strategy.

Optionally, the preset allocation strategy in the above-mentioned Step S201 may be any one of the following:

Strategy A: the first device divides all the CBs of a TB into X CB Groups, wherein, if the sum M of all the CBs is exactly divisible by X, the X CB Groups are allocated the same number of CBs; and if the sum M of all the CBs is not exactly divisible by X, L CBs are allocated to the first or last CB Group among the X CB Groups, and (M−L)/(X−1) CBs are allocated to the remaining CB Groups among the X CB Groups, where L is the remainder of M divided by X−1.

Herein, X=5 is taken as an example, if M=50, the 5 CB Groups are evenly allocated 10 CBs; if M=53, the remainder of M divided by 4 is 1, thus, 1 CB is allocated to the first CB Group, and 13 CBs are allocated to each of the remaining CB Groups. Of course, the configuration may also be that, 13 CBs are allocated to each of the first to fourth CB Groups, and 1 CB is allocated to the fifth CB Group.

The first device sends multiple candidate values of the X to the second device via a first signal, and sends the selected value of the X through the first device to the second device via a second signal; or the first device sends the selected value of the X to the second device via a first signal.

Strategy B: the first device divides all the Bits of a TB into one or more CB Groups, wherein, each of the CB Groups contains an integer number of CBs, and the sum of Bits of each of the CB Groups is less than or equal to Z.

Herein, 6 CBs in total are taken as an example, and for easy illustration, CB #1 CB #6 are used to refer to the 6 CBs, wherein, CB #1, CB #2, CB #3 are respectively 4800 bit, and CB #4, CB #5, CB #6 are respectively 4864 bit. Herein, Z may have a value of 10000 bit, and the allocation method may be that the first device allocates CB #1, CB #2 to CB Group1, because the sum of CB #1, CB #2 is 9600 bit and if CB #3 is further added, the sum would exceed 10000 bit, therefore, the first two CBs are allocated to CB Group1; for the same reason, CB #3, CB #4 are allocated to CB Group2, and CB #5, CB #6 are allocated to CB Group3. Each CB can only be allocated to one CB Group.

Optionally, the first device sends multiple candidate values of the Z to the second device via a first signal, and sends the selected value of the Z through the first device to the second device via a second signal; or the first device sends the selected value of the Z to the second device via a first signal.

Strategy C: if the sum M of all the CBs of a TB is exactly divisible by Y, the first device allocates Y CBs to each CB Group in the TB; if the sum M of all the CBs of a TB is not exactly divisible by Y, the first device allocates P CBs to the first or last CB Group in the TB, and allocates Y CBs to the remaining CB Groups in the TB, where P is the remainder of M divided by Y.

The above-mentioned X, Y, Z are positive integers.

Herein, Y=10 is taken as an example, if M=50, the first device allocates 10 CBs to each CB Group; if M=53, the first device allocates 10 CBs to each of the first five CB Groups, and allocates 3 CBs to the sixth CB Group; or, the first device allocates 3 CBs to the first CB Group, and allocates 10 CBs to each of the subsequent five CB Groups.

Optionally, the first device sends multiple candidate values of the Y to the second device via a first signal, and sends the selected value of the Y through the first device to the second device via a second signal; or the first device sends the selected value of the Y to the second device via the first signal.

The first signal mentioned above may be a Radio Resource Control (RRC) signal, the second signal mentioned above may be a Downlink Control Information (DCI) signal.

In the above-mentioned strategies, the value of X, Y, or Z may be a preset value stored in the second device.

It should be noted that, the above-mentioned method is used for allocation of CB Groups in an initially transmitted TB.

Optionally, the total number of CB Groups in a retransmitted TB equals the total number of unsuccessfully-received CB Groups in the initially transmitted TB.

If the retransmitted TB has multiple CB Groups, the number of CBs or Bits contained in the multiple CB Groups has the same allocation manner as the number of CBs or Bits contained in the corresponding unsuccessfully-received CB Groups in the initially transmitted TB. For example, the initially transmitted TB has 4 CB Groups, and the numbers of CBs of the 4 CB Groups are 4,4,4,3 in sequence. The allocation method of this initially transmitted TB may be implemented by Strategy A or Strategy C. If the first CB Group and the second CB Group are falsely received, the same numbers of CBs are used when retransmitting these two CB Groups, in this way, the user can determine the numbers of CBs contained in the retransmitted CB Groups because the same number of CBs are contained in each CB Group. Even if it is the first CB Group and the fourth CB Group that are falsely received and 7 CBs are contained in the retransmitted TB, the user can still determine that the first 4 CBs are retransmission of the first CB Group and the subsequent 3 CBs are retransmission of the fourth CB Group. Or for another example, if 5 CBs are contained in the retransmitted TB, the user can still determine that the first 3 CBs are retransmission of the first CB Group and the subsequent 2 CBs are retransmission of the fourth CB Group. The practical principle is that the same number of CBs are contained in each CB Group, and if the CBs cannot be divided evenly, the last CB Group (or the first CB Group) contains less CBs.

Step S202, sending the preset allocation strategy through the first device to the second device.

In the technical solution provided by the present disclosure, the CBs in a TB are allocated to obtain at least one CB Group, so that HARQ feedback based on CB Groups can be made, and retransmission based on basic units of CB Groups can also be performed, which may have the advantage of high efficiency.

Figure 3:
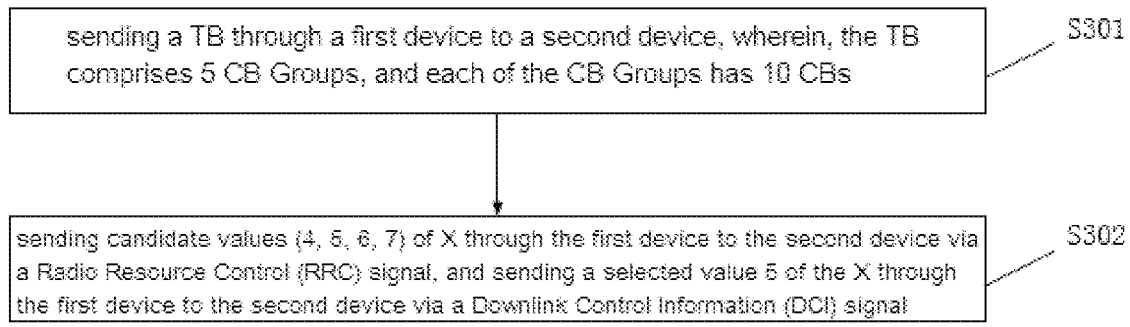
FIG. 3 is a flow chart of an allocation method of Code Block Groups in a Transport Block according to some embodiments embodiment of the present disclosure.

Referring to FIG. 3, FIG. 3 shows an allocation method of Code Block Groups in a Transport Block provided by the present application, which is implemented by a first device, the method as shown in FIG. 3 comprises the following steps:

Step S301, sending a TB through a first device to a second device, wherein, the TB comprises X(5) CB Groups, and each of the CB Groups has 10 CBs.

Step S302, sending candidate values (4, 5, 6, 7) of X through the first device to the second device via a Radio Resource Control (RRC) signal, and sending a selected value 5 of the X through the first device to the second device via a Downlink Control Information (DCI) signal.

In the technical solution provided by the present disclosure, the CBs in a TB are allocated to obtain at least one CB Group, so that HARQ feedback based on CB Groups can be made, and retransmission based on basic units of CB Groups can also be performed, which may have the advantage of high efficiency.

Optionally, the Y value in Strategy C and the Z value in Strategy B can be handled in a similar manner referring to the handling manner of the X value as shown in FIG. 3.

Figure 4:
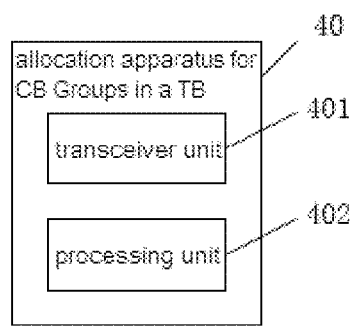
FIG. 4 is a block diagram of an allocation apparatus for Code Block Groups in a Transport Block provided by the present disclosure.

Referring to FIG. 4, FIG. 4 shows an allocation apparatus 40 for Code Block Groups in a Transport Block. The apparatus 40 comprises a transceiver unit 401 and a processing unit 402.

The transceiver unit 401 is for sending a TB to a second device, wherein, the TB comprises at least one CB Group which is obtained by the processing unit 402 allocating the CBs in the TB according to a preset allocation strategy; and the transceiver unit is also for sending the preset allocation strategy to the second device.

Optionally, the preset allocation strategy is that a first device divides all the CBs of a TB into X CB Groups, wherein, if the sum M of all the CBs is exactly divisible by X, the X CB Groups are allocated the same number of CBs; and if the sum M of all the CBs is not exactly divisible by X, L CBs are allocated to the first or last CB Group among the X CB Groups, and (M−L)/(X−1) CBs are allocated to the remaining CB Groups among the X CB Groups, where L is the remainder of M divided by X−1.

Optionally, the preset allocation strategy is that a first device divides all the Bits of a TB into one or more CB Groups, wherein, each of the CB Groups contains an integer number of CBs, and the sum of Bits of each of the CB Groups is less than or equal to Z.

Optionally, the preset allocation strategy is that, if the sum M of all the CBs of a TB is exactly divisible by Y, the first device allocates Y CBs to each CB Group in the TB; if the sum M of all the CBs of a TB is not exactly divisible by Y, the first device allocates P CBs to the first or last CB Group in the TB, and allocates Y CBs to the remaining CB Groups in the TB, where P is the remainder of M divided by Y.

Optionally, the transceiver unit 401 is particularly for sending multiple candidate values of the X to a second device via a first signal, and sending the selected value of the X to the second device via a second signal; or sending the selected value of the X to a second device via a first signal.

Optionally, the transceiver unit 401 is particularly for sending multiple candidate values of the Z to a second device via a first signal, and sending the selected value of the Z to the second device via a second signal; or sending the selected value of the Z to a second device via a first signal.

Optionally, the transceiver unit 401 is particularly for sending multiple candidate values of the Y to a second device via a first signal, and sending the selected value of the Y to the second device via a second signal; or sending the selected value of the Y to a second device via a first signal.

Optionally, the value of X, Y, or Z is a preset value stored in the second device.

Optionally, the apparatus is configured for allocation of CB Groups in an initially transmitted TB.

Optionally, the total number of CB Groups in a retransmitted TB equals the total number of unsuccessfully-received CB Groups in the initially transmitted TB.

Optionally, if the retransmitted TB has multiple CB Groups, the processing unit allocates the number of CBs or Bits contained in the multiple CB Groups in the same allocation manner as the number of CBs or Bits contained in the corresponding unsuccessfully-received CB Groups in the initially transmitted TB.

In the technical solution provided by the present disclosure, the CBs in a TB are allocated to obtain at least one CB Group, so that HARQ feedback based on CB Groups can be made, and retransmission based on basic units of CB Groups can also be performed, which may have the advantage of high efficiency.

Figure 5:
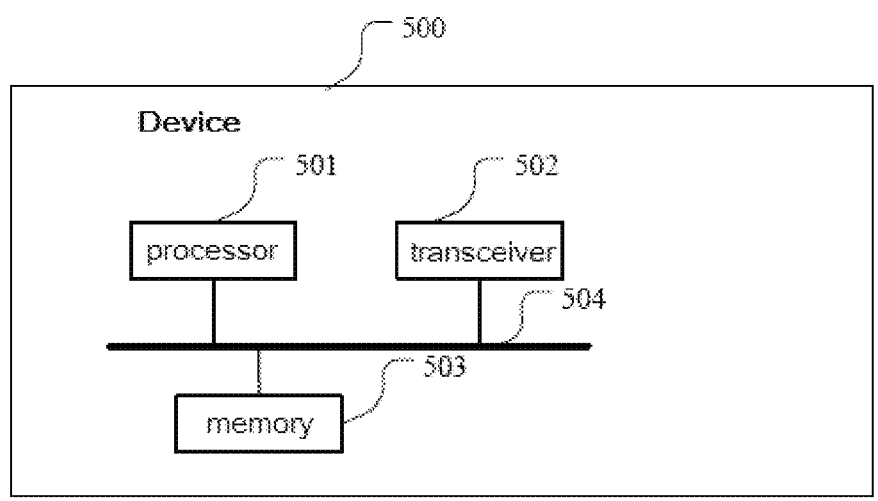
FIG. 5 is a schematic diagram of hardware structure of a first device provided by an embodiment of the present disclosure.

Referring to FIG. 5, the embodiments of the present disclosure also provide a device 500, which includes, but not limited to, a smartphone, a smart watch, a tablet computer, a personal computer, a notebook computer or a computer group, this device may be the first device mentioned above or may also be the second device mentioned above. As shown in FIG. 5, the device 500 comprises a processor 501, a memory 502, a transceiver 503 and a bus line 504. The transceiver 503 is for sending data to and receiving data from external devices. The processor 501 in the terminal device 500 may be one or more. In some embodiments of the present application, the processor 501, the memory 502 and the transceiver 503 may be interconnected by the bus line or in other ways. The device 500 can be used to perform the method shown in FIG. 2 or FIG. 3. The meaning and examples of the technical terms involved in this embodiment can refer to corresponding description of FIG. 2 or FIG. 3, which are not described repeatedly herein.

Wherein, the memory 502 stores program codes; and the processor 605 calls the program codes stored in the memory 605 to execute the steps shown in FIG. 2 or FIG. 3.

It should be noted that, the processor 501 herein may be one processing element, or may be a joint name of multiple processing elements. For example, the processor may be a Central Processing Unit (CPU), or may be an Application Specific Integrated Circuit (ASIC), or may be configured as one or more integrated circuits for implementing the embodiments of the present application, such as one or more Digital Signal Processors (DSPs), one or more Field Programmable Gate Arrays (FPGAs).

The memory 502 may be one storage element, or may be a joint name of multiple storage elements, for storing executable program codes as well as parameters and data required for running the application program. The memory 502 may comprise a Random Access Memory (RAM), or a non-volatile memory such as a magnetic storage or a Flash drive.

The bus line 504 may be an Industry Standard Architecture (ISA) bus line, a Peripheral Component Interface (PCI) bus line, or an Extended Industry Standard Architecture (EISA) bus line. The bus line can be classified into an address bus line, a data bus line and a control bus line. For easy depiction, FIG. 5 uses only one thick line to show it, but this does not mean there is only one bus line or one type of bus line.

The device 500 may also comprise an input and output apparatus connected to the bus line 504, so as to be connected to other components such as the processor 501 through the bus line. The input and output apparatus provide an input interface for an operator, so that the operator can select a controlled option through this input interface; it may also be other interfaces for connecting to other external devices.

It should be noted that, for easy description, the aforementioned various method embodiments are described as a combination of a series of operations, however, as should be known by a person skilled in the art, the present disclosure is not limited to the described sequence of operations, because, according to the present disclosure, some of the steps can be performed in another sequence or performed concurrently. Secondly, as also should be known by a person skilled in the art, the embodiments described in the specification are only exemplary, and the operations and units involved may be optional.

In the aforementioned embodiments, the various embodiments are described with their own emphases, and the part not described in detail in one embodiment can refer to related description in other embodiments.

The steps in the method embodiments of the present disclosure can be adjusted with respect to their sequence, combined, or omitted, according to actual requirements.

The units in the apparatus embodiments of the present disclosure can be combined, divided or omitted according to actual requirements. A person skilled in the art can combine various embodiments as well as various features of embodiments described in the specification.

From the aforementioned embodiments, a person skilled in the art can clearly know the present disclosure may be implemented by software, hardware, firmware or a combination thereof. When it is implemented by software, the aforementioned functions may be stored in a computer readable medium or transmitted as one or more instructions or codes on a computer readable medium. The computer readable medium includes a computer storage medium and a communication medium, wherein, the communication medium includes any medium for transmitting a computer program from one place to another; the storage medium may be any usable medium for a computer to access. The computer readable medium may include, for example, but not limited to, a Random Access Memory (RAM), a Read-Only Memory (ROM), an Electrically Erasable Programmable Read-Only Memory (EEPROM), a Compact Disk Read-Only Memory (CD-ROM) or other optical disk storage media, a magnetic disk storage medium or other magnetic disk storage devices, or any other media capable of carrying or storing the desired program codes with instructions and data structure forms and capable of being accessed by a computer. Besides, any connection medium can be a suitable computer readable medium. For example, if the software is transmitted from a website, a server or other remote sources by means of a coaxial cable, an optical fiber cable, a twisted-pair cable, a Digital Subscriber Line (DSL), or a wireless technique such as infrared, wireless waves or microwaves, then such coaxial cable, optical fiber cable, twisted-pair cable, DSL, or wireless technique such as infrared, wireless waves or microwaves are all covered by the definition of the computer readable medium. As used in the present disclosure, a Disk/disk includes a Compact Disk (CD), a laser Disk, an optical Disk, a Digital Versatile Disk (DVD), a floppy disk, or a Bluelight Disk, wherein, a disk copies data magnetically, while a Disk copies data optically with laser. A combination of the above should also be included in the protection scope of the computer readable medium.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A method for allocating Code Blocks of Bits in a Transport Block for Hybrid Automatic Repeat request (HARQ) simultaneously supporting enhanced Mobile BroadBand (eMBB) and Ultra-Reliable and Low Latency Communications (URLLC), wherein the method comprises the following steps:
   a first device divides all Code Blocks of Bits in a Transport Block to be sent to a second device into X Code Block Groups, where X is a positive integer, wherein
   if the sum M of all the Code Blocks is exactly divisible by X, each of the X Code Block Groups are allocated the same number of Code Blocks; and
   if the sum M of all the Code Blocks is not exactly divisible by X and L is a remainder of M divided by X−1, L Code Blocks are allocated to the first or last Code Block Group among the X Code Block Groups, and (M−L)/(X−1) Code Blocks are allocated to each of the remaining Code Block Groups among the X Code Block Groups; and
   the first device sends multiple candidate values of X to the second device via a first signal and sends the selected value of X to the second device via a second signal; or the first device sends the selected value of X to the second device via a first signal.

2. A method for allocating Code Blocks of Bits in a Transport Block for Hybrid Automatic Repeat request (HARQ) simultaneously supporting enhanced Mobile BroadBand (eMBB) and Ultra-Reliable and Low Latency Communications (URLLC), wherein the method comprises the following steps:
   a first device divides all Code Blocks of Bits in a Transport Block to be sent to a second device into a plurality of Code Block Groups, wherein
   if the sum M of all the Code Blocks is exactly divisible by Y, the first device allocates Y Code Blocks to each of the plurality of Code Block Groups, wherein Y is a positive integer;
   if the sum M of all the Code Blocks is not exactly divisible by Y and P is a remainder of M divided by Y, the first device allocates P Code Blocks to the first or last Code Block Group among the plurality of Code Block Groups, and allocates the Y Code Blocks to each of the remaining Code Block Groups among the plurality of Code Block Groups; and the first device sends multiple candidate values of Y to the second device via a first signal and sends the selected value of Y to the second device via a second signal; or the first device sends the selected value of Y to the second device via a first signal.

3. An electronic device for allocating Code Blocks of Bits in a Transport Block for Hybrid Automatic Repeat request (HARQ) simultaneously supporting enhanced Mobile BroadBand (eMBB) and Ultra-Reliable and Low Latency Communications (URLLC), comprising a processor, a memory and a transceiver interconnected by a bus line, the transceiver is for sending and receiving data, the memory is for storing program codes, the processor is for calling the program codes stored in the memory to execute the following steps:

dividing all Code Blocks of Bits in a Transport Block to be sent to a second device into X Code Block Groups, where X is a positive integer, wherein if the sum M of all the Code Blocks is exactly divisible by X, each of the X Code Block Groups are allocated the same number of Code Blocks; and if the sum M of all the Code Blocks is not exactly divisible by X and L is a remainder of M divided by X−1, L Code Blocks are allocated to the first or last Code Block Group among the X Code Block Groups, and (M−L)/(X−1) Code Blocks are allocated to each of the remaining Code Block Groups among the X Code Block Groups; and sending multiple candidate values of X to the second device via a first signal and sending the selected value of X to the second device via a second signal; or sending the selected value of X to the second device via a first signal.

4. An electronic device for allocating Code Blocks of Bits in a Transport Block for Hybrid Automatic Repeat request (HARQ) simultaneously supporting enhanced Mobile BroadBand (eMBB) and Ultra-Reliable and Low Latency Communications (URLLC), comprising a processor, a memory and a transceiver interconnected by a bus line, the transceiver is for sending and receiving data, the memory is for storing program codes, the processor is for calling the program codes stored in the memory to execute the following steps:

dividing all Code Blocks of Bits in a Transport Block to be sent to a second device into a plurality of Code Block Groups, wherein if the sum M of all the Code Blocks is exactly divisible by Y, allocating Y Code Blocks to each of the plurality of Code Block Groups, wherein Y is a positive integer;

if the sum M of all the Code Blocks is not exactly divisible by Y and P is the remainder of M divided by Y, allocating P Code Blocks to the first or last Code Block Group among the plurality of Code Block Groups, and allocating the Y Code Blocks to each of the remaining Code Block Groups among the plurality of Code Block Groups; and sending multiple candidate values of Y to the second device via a first signal and sending the selected value of Y to the second device via a second signal; or sending the selected value of Y to the second device via a first signal.

* * * * *